Feb. 3, 1970    C. A. RICHIE    3,493,640
APPLICATION OF PLASTIC ENDS TO CONTAINER BODIES
Filed Jan. 6, 1967    3 Sheets-Sheet 1

INVENTOR.
CARLTON A. RICHIE
BY J. R. Nelson and
W. A. Schuich
ATTORNEYS

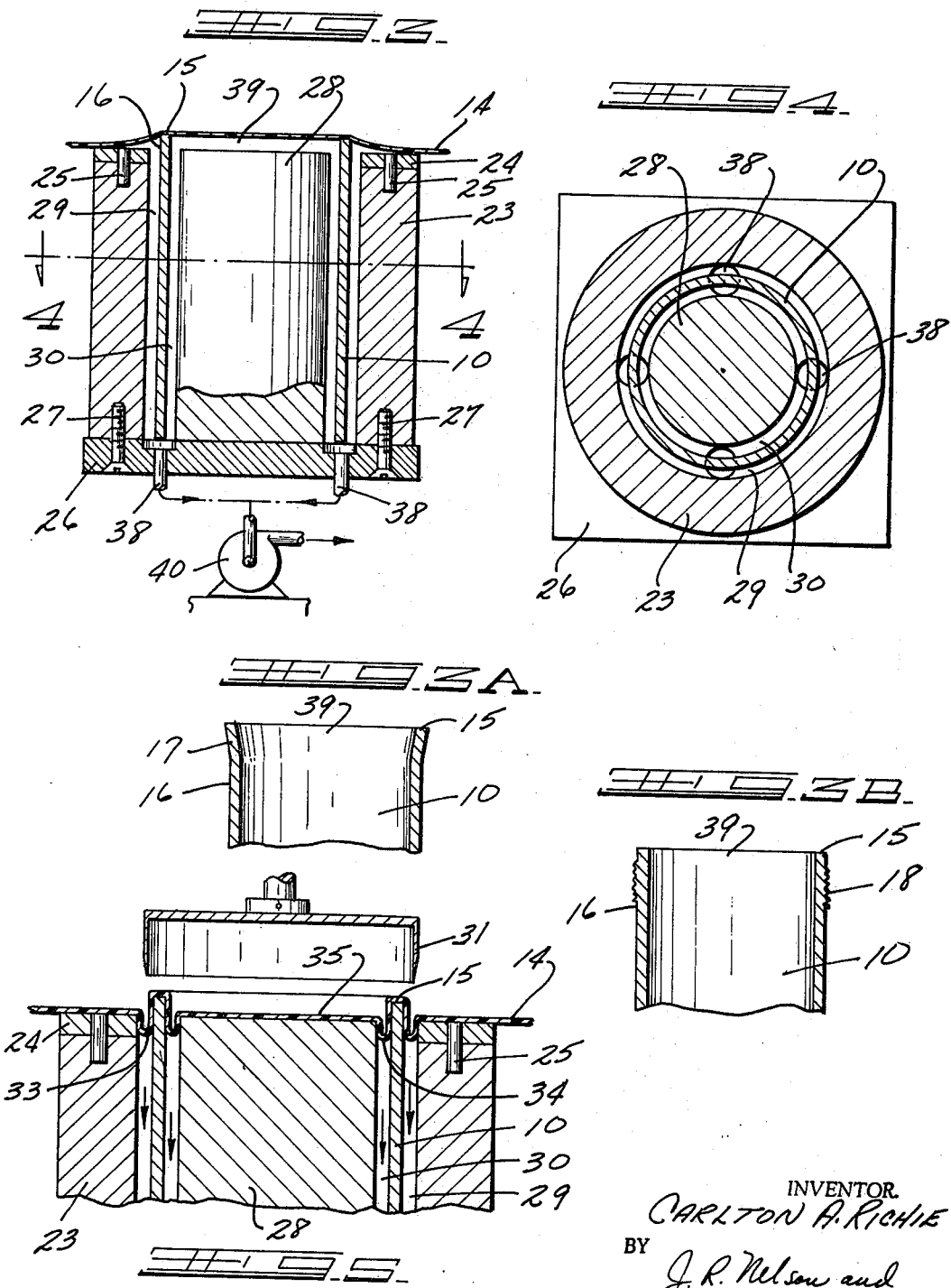

Feb. 3, 1970    C. A. RICHIE    3,493,640
APPLICATION OF PLASTIC ENDS TO CONTAINER BODIES
Filed Jan. 6, 1967    3 Sheets-Sheet 3
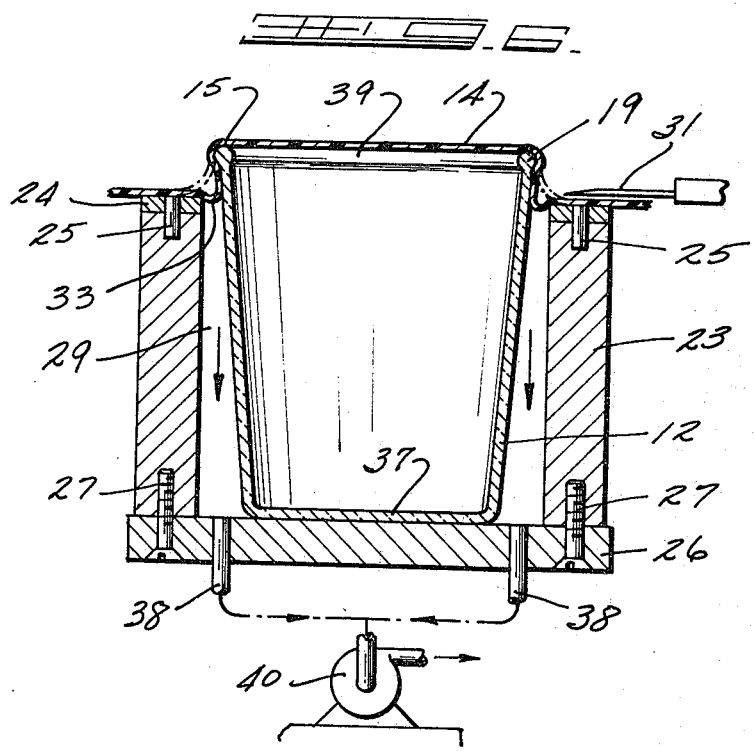
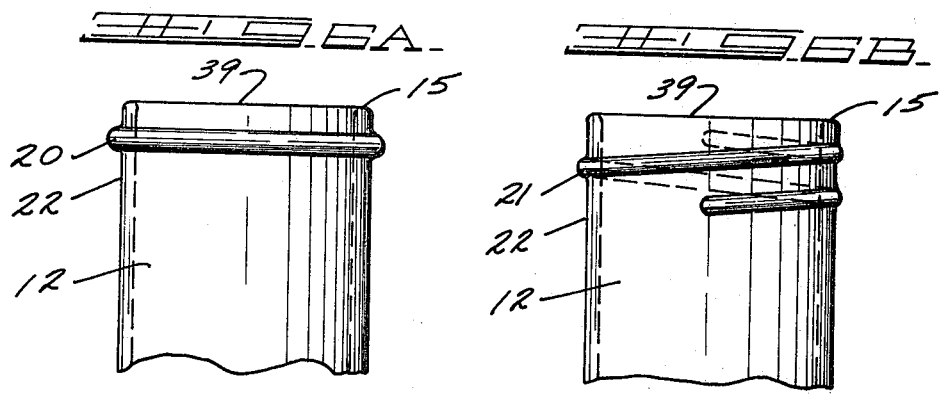
INVENTOR.
CARLTON A. RICHIE
BY
J. R. Nelson and
W. A. Schaich
ATTORNEYS

# United States Patent Office 3,493,640
Patented Feb. 3, 1970

3,493,640
APPLICATION OF PLASTIC ENDS TO CONTAINER BODIES
Carlton A. Richie, Toledo, Ohio, assignor to Owens-Illinois, Inc., a corporation of Ohio
Filed Jan. 6, 1967, Ser. No. 607,744
Int. Cl. B29c 17/04; B29d 31/00
U.S. Cl. 264—90    3 Claims

ABSTRACT OF THE DISCLOSURE

A method for forming a sheet material into a container end-cover and, simultaneously attaching the end-cover about the rim of the container. A formable plastic sheet is positioned about the container rim and a forming force is exerted upon the sheet adjacent the container sides, whereby the sheet seals and attaches to the container.

BACKGROUND OF INVENTION

This invention relates to containers and plastic end-covers therefor; more particularly, it relates to a method of shaping and forming thermoplastic sheet or web materials about an otherwise open container mouth to provide same with a sealed plastic end. Presently, the use of plastic as end-covers for various containers has been somewhat limited because of the comparative cost involved in their manufacture and because of deficient sealing characteristics. The plastic covers currently in commercial use, are produced by various sheet forming processes as preformed covers and are subsequently applied to the containers. Notwithstanding numerous modifications of these sheet forming processes, they essentially are of four basic types: matched-mold forming; slip forming; air blowing and vacuum forming.

In manufacturing articles by the match-molding process, the thermoplastic sheet is heated to a temperature at which it becomes softened and is subjected to the forming operation; this forming takes place in a hydraulic press between registered male and female mold members. Slip forming, which also requires a pneumatic or hydraulic press, is a method of mechanically forming a heated thermoplastic sheet around a male mold member. Air blowing and vacuum forming, while not requiring hydraulic presses, use molding members similar to those employed in the match-molding and slip forming techniques. In the air blowing process a sheet of thermoplastic composition is placed upon a female mold cavity and heated to a point whereby it slumps; subsequently, pressurized air is applied causing the plastic to conform to the shape of the female mold. Vacuum forming essentially consists of the positioning of a sheet of material upon a mold and heating said sheet to a formable state; vacuum is then drawn within the mold cavity, thereby causing the formable sheet to be pressed against the profile defining cavity as a result of atmospheric pressure.

In addition to the expense involved with the foregoing general types of forming techniques, resulting from the necessary use of molds, the covers produced have the additional general drawback of possessing poor sealing properties. This sealing deficiency probably results from the fact that the forming and manufacturing of the cover is done independent of its application to the otherwise open end of the container. Since it is nearly impossible to form containers and covers which are free of microscopic imperfections, the probability is high that the preformed cover imperfections will not mate properly with those of the container.

Another general method of applying plastic end-covers involves the bonding of a plastic sheet to the container rim by means of an adhesive. This method, especially in the case of packaged comestibles, is unwise from a marketing viewpoint since, upon removing the film, a visible portion of the adhesive will remain upon the rim of the container. This rough appearing residual adhesive usually has an adverse psychological impact on the consumer.

SUMMARY OF INVENTION

Accordingly, it is an object of this invention to provide a novel method for applying plastic covers to containers to produce a more efficient seal therebetween.

It is another object to provide a novel method for applying tight fitting plastic covers to various containers which do not require the use of adhesives to secure or seal said cover to the container.

It is yet another object of this invention to provide a method for forming thermoplastic sheet materials into covers for containers and simultaneously applying and sealing these covers to the otherwise open container end.

In the achievement of the foregoing, and other objects, the invention contemplates positioning a formable sheet material on the rim of the container, said sheet also extending outwardly of the rim, and applying a downwardly directed forming force on said sheet inwardly of its periphery, whereby the sheet seals and attaches to the upper margin of the container sides.

The sheet materials suitable for use in this invention are the formable plastics, including those capable of being formed into various shapes by the general types of plastic forming processes hereinbefore noted; the preferred plastics being those organic polymers generally referred to in the arts as acrylics, nylons, styrenes, vinyls and olefins, this latter class including both the high and low density compositions. Sheets of the above mentioned materials may be manufactured by any of the numerous conventional methods, for example by extrusion, casting, drawing, pressing, calendering or combinations thereof. Additionally, these sheets may also be colored by the addition of suitable colorants, for example, titania or lithod red, according to methods well known in the arts.

The above noted objects, and others, will become apparent by reference to the appended drawings, of which:

FIGURE 3 is a vertical sectional view showing an open-ended cylindrical composite container positioned in a cover forming apparatus.

FIGURES 3a and 3b are sectional views of containers having modified neck and rim portions about which a plastic cover may be applied by the method of this invention.

FIGURE 4 is a sectional view of the arrangement shown in FIGURE 3, taken at the plane 4—4.

FIGURE 5 is a partial sectional view of the container and apparatus of FIGURE 3, and shows the sheet material on said container during the forming operation.

FIGURE 6 is a vertical sectional view of another embodiment of this invention, illustrating the application of a plastic cover to the open end of a beaded glass container.

FIGURES 6a and 6b respectively show alternate neck and rim portions of a container about which a cover may be applied by the method of this invention.

Figure 1:
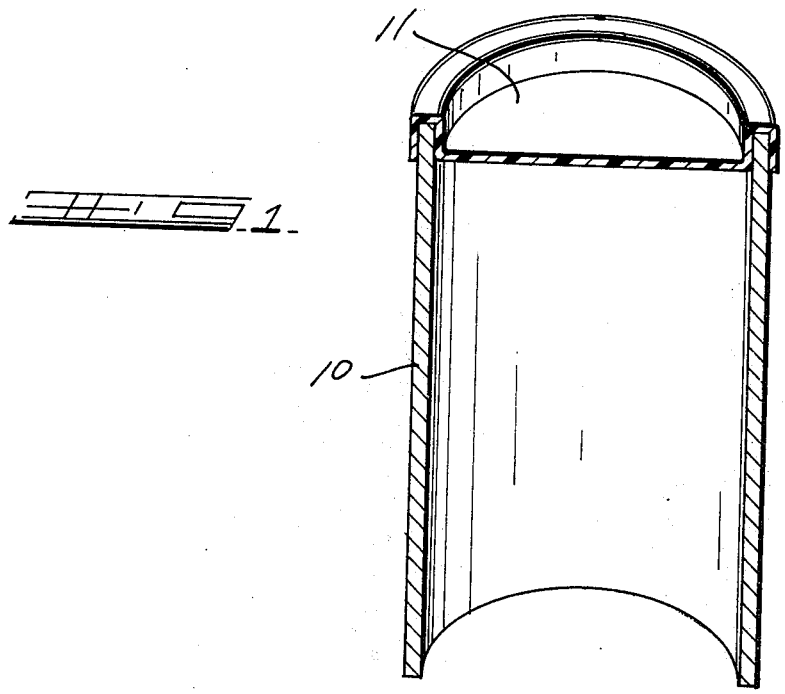
FIGURE 1 is a sectional view of a cylindrical, composite container having open ends, one of which contains a cover applied by the method of this invention.
Figure 2:
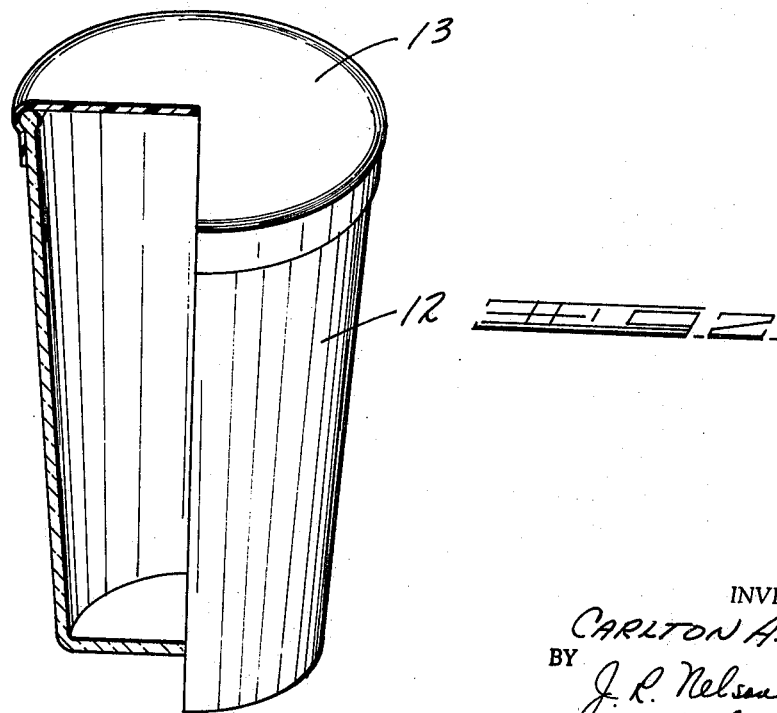
FIGURE 2 is a sectional view of a beaded glass tumbler showing a plastic cover applied by the novel method of this invention.

Referring to the drawings, FIGURE 1 shows an open-ended composite container 10, having attached to one of its ends a cover 11 of plastic material. Typically, this type of container comprises a cylinder of spirally wound kraft paper and possesses an internal lining, for example aluminum foil. In FIGURE 2, a beaded glass tumbler 12 is shown with a cover 13 applied to its open end by this invention.

The method of applying the cover of the container of FIGURE 1 is best understood by reference to FIGURES 3, 3a and 3b, 4 and 5. In these views, like numbers designate like components.

FIGURE 3 shows a cylindrical composite container sleeve 10 terminating in an annular rim 15, defining the mouth 39 of said container. The container sleeve 10 is positioned within a circumscribing, coaxial collar member 23 at a radial, annular distance 29 therefrom, said collar having removably mounted and positioned at its upper extremity, by means of positioning pins 25, a spacer 24 which function will be described later. Positioned within the container sleeve 10 and at an annular radial distance 30 therefrom, is a mandrel member 28. In a preferred embodiment of this invention the upper surfaces of both the mandrel 28 and the collar 23 are below the plane defined by the rim of the container sleeve. Also shown is a collar and mandrel supporting member 26, said collar preferably being fastened thereto, for example, by studs 27. The annularly disposed air gaps 29 and 30 are connected, for example by pipes or ducts 38 passing through the supporting member 26, to a suitable vacuum source 40, such as a conventional vacuum pump. Preferably the sleeve 10 is positioned above these ducts to bisect same and thereby ensure that an equilibrium pressure will exist between the annular zones 29 and 30 respectively.

FIGURES 3a and 3b show alternate container configurations which may be sealed by the method and apparatus of this invention. In FIGURE 3a, the container 10 has a neck 16 terminating in an annular outwardly disposed flared section 17, said section terminating in a rim 15 defining the mouth 39 of the container. Similarly, FIGURE 3b shows a container neck 16 having an outwardly disposed, annular friction surface, for example knurlings 18.

To form the plastic cover a sheet material 14, which may be a high or low density polyethylene, is positioned about the rim 15 of the container. However, before applying the forming force, the sheet must be in a plastic, formable state; this may be accomplished by heating the sheet above its softening point subsequent to the positioning on the rim or, by positioning a priorly softened sheet onto the container rim, for example as a continuous web directly from an extruder. In addition to enclosing the mouth of the container, the sheet must have a sufficient cross sectional area, or peripherally defined dimensions, that it bridges the upper portion of the annular zone 29 and contacts the upper extremity of collar 23; thereby, the sheet has an outwardly disposed portion which, in addition to enveloping the container mouth 39, will be capable of overlapping the mouth defining rim 15 and extending downwardly along the outer surface of the container sides 16. When vacuum is applied by the source 40 through ducts 38 to the annular zones 29 and 30, the formable thermoplastic sheet is, by the pneumatic force of the atmospheric air directed into sealing and contacting engagement with the rim and the container sides. FIGURE 5 shows the deformed sheet as component 35. It will be noted that, during this forming the sheet develops an annular outwardly disposed concave surface 33 slightly below the upper surface of the removably mounted spacers 24 and within the annular zone 29. Consequently, the distance existing between the container rim 15 and upper surface of the collar 23 nominally defines the lateral extent to which the cover will seal the exteriorly disposed container surface. Hence, the removable spacers 24 which define the upper surface of the collar 23 are used to control this lateral dimension. For example, if the container having the knurled neck 18 of FIGURE 3b was being covered, the spacers 24 would preferably be positioned below the lower extremities of the knurlings to enable the sheet to form over and seal them.

Because the annular zones 29 and 30 are maintained at an equilibrium pressure, the internal annular zone 30 will also be under a negative pressure and therefore, the sheet material will be pneumatically directed to engage the upper surface of the mandrel 28 and the internal surface of the container, thereby creating an internal annular, concave formation 34. Like the upper surface of the collar 23, the upper surface of the mandrel 28 nominally determine the depth to which the sheet will internally engage the container. The formable sheet material, which has now been shaped into an end-cover, upon cooling to room temperature shrink fits upon the container, thereby providing a tight fitting cover.

After the sheet material has been shaped and formed into the container end-cover the remainder of the sheet, notably that externally disposed portion not comprising the end-cover, is severed from the cover portion. This may be accomplished by utilizing any of the conventional trimming techniques employed in the plastic forming processes; one such technique is a punch type trimmer 31 having its lower margin formed with knife-edges. Preferably the knife-edge trimmer is of the heated type which is also well known to those skilled in the art; this preference results from the fact that, upon contacting the plastic, the heated knife half cuts and half melts its way through, thereby minimizing the force necessary for cutting.

While the above description pertains to applying a cover to one end of a container which initially had two open ends, the same method may generally be employed when sealing a container whose opposite end has already been sealed. FIGURES 6, 6a and 6b may be referred to for the method of sealing these types of containers.

FIGURE 6 shows a glass tumbler 12 terminating in an upper annular bead 19 defining the mouth 39 of said container. FIGURE 6a shows a container 12 terminating in a generally cylindrical neck 22 having an outwardly disposed lug 20 beneath the mouth defining rim 15. Similarly, FIGURE 6b shows the neck portion of a container having screw threads 21. Both of these containers can be covered in accordance with this invention provided the dimensions of the sheet are such that the distance from its periphery to the container rim exceeds the distance from the container rim to the outwardly disposed projections.

In FIGURE 6, the components of the apparatus used to form the cover have like numerical designations with those noted previously. The only modifications, resulting from the container having a closed bottom portion 37, is that only an outward annular zone 29 is provided for by the circumscribing collar 23. As hereinbefore noted, the sheet 14 is positioned about the rim 15 so as to bridge the annular gap 29 and contact the upper surface of the collar and its spacer, 23 and 24 respectively. This upper surface is shown positioned below the bead 19 in order that the cover may envelop same and extend laterally along the outer surface of the container. Upon vacuum application via source 40 and ducts 38, the sheet is directed to the outwardly exposed portions of the container. The separation of the cover portion from the remaining sheet material is effectuated by a side type trimmer 31 which may, for example, comprise a manually utilized linoleum knife.

The following conditions are given to aid in duplicating the invention and are intended to be exemplary, and by no way are intended as any limitation upon the scope of this invention. Typically, a spacing of ⅛ inch to 1 inch was used between the upper surface of the removable spacers and the rim of the container. The sheet materials were generally applied in thickness up to .050 inch and formed to the container under a vacuum of 15–28 inches of mercury; in order to impart sufficient pliability to allow the sheet to be formed into an end-cover, sheet temperatures in the range of 180–400° F. were employed. Additionally, the spacing between the internal surface of the removable spacers and the external surface of the container varied in the range of 0.01–0.10 inch.

I claim:

1. The method of statically providing an end cover for an open-mouth container which comprises: coaxially positioning a container, having a side wall terminating in a rim defining the open mouth thereof, within and in spaced relation to a circumscribing collar member such that said rim is disposed substantially above the upper surface of said collar member, thereby forming a gap between said side wall and said collar member; positioning a formable plastic sheet material upon said rim, said sheet material having a size sufficient to contact the upper surface of said collar member with peripheral portions thereof; creating a vacuum in said gap of sufficient magnitude to cause adjacent portions of said sheet material to be drawn into said gap to a level beneath the upper surface of said collar member and to sealingly engage said rim and said side wall of said container, thereby forming an end cover on said container; and removing the remaining portion of said sheet material which is not in engagement with the side wall.

2. The method of statically providing an end cover for a container which comprises: coaxially positioning a cylindrical walled container, having a rim, between a mandrel and a collar in spaced relationship thereto, said rim being disposed substantially upward of the upper surfaces of said mandrel and collar respectively and thereby forming a first gap between said mandrel and said container and a second gap between said collar and said container; positioning an unconfined formable plastic sheet material upon said rim and contacting the upper surface of said collar with peripheral portions of said sheet; evacuating said first and second gaps with a vacuum of sufficient magnitude to cause adjacent portions of said sheet material to be drawn into said gaps and to sealingly engage said container rim and the adjacent inside and outside surfaces of said container wall, thereby forming an end cover; and trimming away the remaining portion of said sheet material.

3. The method which comprises the steps of: coaxially positioning a container having an external side terminating in a rim defining an open mouth of said container and including outwardly extending projections on said external side within and in spaced relation to a circumscribing stationary collar at a level such that said outwardly extending projections are disposed upwardly of the upper surface of said collar, said spaced relation thereby creating a gap between said container and said collar; positioning a formable plastic sheet material upon said rim and overlying the upper surface of said collar with peripheral portions of said sheet material; evacuating said gap with a vacuum of sufficient magnitude to cause adjacent portions of said sheet material to be drawn into said gap to a level below the upper surface of said collar and to sealingly engage said rim and said outwardly extending projections, thereby forming an end cover for said container; and removing the remaining portion of said sheet material.

References Cited

UNITED STATES PATENTS

| 331,764 | 12/1885 | Brush | 264—274 X |
| 3,159,695 | 12/1964 | Behringer | 264—92 X |

ROBERT F. WHITE, Primary Examiner

J. H. SILBAUGH, Assistant Examiner

U.S. Cl. X.R.

18—19; 264—271